(12) United States Patent
Meijer et al.

(10) Patent No.: US 8,250,528 B2
(45) Date of Patent: Aug. 21, 2012

(54) STATIC INHERITANCE SYSTEMS AND METHODS

(75) Inventors: Henricus Johannes Maria Meijer, Mercer Island, WA (US); Sergey Dubinets, Bellevue, WA (US); Yan V. Leshinsky, Bellevue, WA (US); Evgeny N. Veselov, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 2116 days.

(21) Appl. No.: 11/012,409

(22) Filed: Dec. 15, 2004

(65) Prior Publication Data
US 2006/0150146 A1    Jul. 6, 2006

(51) Int. Cl.
*G06F 9/44* (2006.01)
(52) U.S. Cl. ........................................ 717/116; 717/114
(58) Field of Classification Search ........... 717/114–119
See application file for complete search history.

(56) References Cited

U.S. PATENT DOCUMENTS

| | | | | |
|---|---|---|---|---|
| 5,313,630 | A * | 5/1994 | Namioka et al. | 1/1 |
| 5,446,902 | A * | 8/1995 | Islam | 717/116 |
| 5,948,107 | A * | 9/1999 | Ramanathan | 714/2 |
| 7,013,466 | B2 * | 3/2006 | Carey et al. | 719/316 |
| 2001/0029604 | A1 * | 10/2001 | Dreyband et al. | 717/7 |
| 2003/0172192 | A1 * | 9/2003 | Carey et al. | 709/315 |
| 2005/0149914 | A1 * | 7/2005 | Krapf et al. | 717/136 |

OTHER PUBLICATIONS

Thorup et al., "Object-Oriented Programming and Standard ML," 1994, ACM, p. 41-49.*
"LensTransformer.java," 2003, The JUNG Project and the Regents of the University of California, p. 1-4.*
Dean et al., "Optimization of Object-Oriented Programs Using Static Class Hierarchy Analysis," 1995, Springer-Verlag, p. 77-101.*
Bruce, Kim B., "Safe static type checking with systems of mutually recursive classes and inheritance," Oct. 12, 1997, p. 1-9.*
C. Clifton, et al., MultiJava: Modular Open Classes and Symmetric Multiple Dispatch for Java, 2000 ACM Conference on Object-Oriented Programming Systems, Languages, and Applications (OOPSLA '00). Oct. 2000, Minneaplolis, MN, U.S., 16 pages.

* cited by examiner

*Primary Examiner* — Wei Zhen
*Assistant Examiner* — Qing Chen
(74) *Attorney, Agent, or Firm* — Workman Nydegger

(57) ABSTRACT

The subject invention pertains to a system and method of extending programming languages to enable static inheritance. In particular, static subclasses can be defined which extend class functionality and/or behaviors without extending base class state. The subclasses can be specified to include static fields as well as static or instance methods and/or properties that provide a more specific interpretation of an object without extending the state thereof. Furthermore, a static subclass can be specified to provide for type aliasing. Casting is also enabled in both directions between base class type and derived class type in a convenient manner without run-time performance penalties. According to one aspect of the invention, the disclosed systems and methods can be employed to create specific programmatic context, for instance for accessing, manipulating, and type checking external data (e.g., XML).

18 Claims, 14 Drawing Sheets

STATIC INHERITANCE SYSTEMS AND METHODS

TECHNICAL FIELD

The subject invention relates generally to computers and more particularly toward class extension and inheritance in programming languages.

BACKGROUND

Programming languages are formal languages employed specifically to communicate instructions to computers or microprocessors for task execution. Through the years, object oriented programming has become one of many familiar and popular models designers and programmers utilize to implement functionality within computer systems. Object oriented programming is unique at least because it is premised on viewing programming in terms of objects or things rather than actions like other models.

The benefit of object technology arises out of three basic principles: encapsulation, polymorphism and inheritance. Objects hide or encapsulate the internal structure of their data and associated methods. Instead of exposing implementation details, objects present interfaces that represent their abstractions cleanly without extraneous information. Polymorphism takes encapsulation one-step further. Polymorphism allows the use of the same code for different data types—the idea being many shapes, one interface. Hence, a software component can make a request of another component without knowing exactly what that component is. The component that receives the request interprets it and figures out according to its variables and data how to execute the request. The third principle is inheritance, which enables developers to reuse pre-existing design and code. This capability allows developers to avoid creating all software from scratch. Rather, through inheritance, developers can derive subclasses that inherit and modify both state and behaviors of other classes.

The object oriented programming model is often defined via a class-based approach. In this system, objects are entities including both state and behavior. Both the state and behavior of an object are defined by a class, which identifies objects of a particular type. An object created based on a class definition is considered an instance of that class reflected in a dynamic type. Thus, a class specifies the data (i.e., state) that the object can contain as well as methods, functions, or behaviors that the object can perform. Methods operate to modify the internal state of the associated objects by altering the data contained therein. The combination of such data and methods in objects is often referred to as encapsulation in object-oriented programming. Encapsulation provides for the state of an object to be changed only by well-defined methods associated with the object. When the behavior of an object is confined to such well-defined locations and interfaces, changes (e.g., code modifications) in the object will have minimal impact on the other objects and elements in the system.

As mentioned briefly above, one of the most important features of object-oriented programming is inheritance. Inheritance describes a relationship between at least two classes. In particular, a class or subclass may be derived from another class (called a base class, parent class, etc.), where the subclass inherits the data attributes or state and methods of the base class. Stated differently, a class is inherited if it shares, modifies or extends another class state and behavior. Conventional class inheritance is typically employed for two purposes: (1) constraining a value set of a class by adding new fields and virtual methods and (2) adding methods allowing manipulation of an object's state in some convenient manner. These two needs are tightly related and are considered very dependent upon one another.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Briefly described, the subject invention concerns systems and methods for extending programming language classes and implementation of static inheritance. More specifically static subclasses are presented herein that can provide additional methods, functions or behaviors to extend base classes. Unlike conventional subclasses, proper static subclasses do not add or extend the state of the base class from which it inherits. This relationship between static subclasses and base classes can be referred to as static inheritance. Static inheritance provides several benefits not appreciated by the conventional inheritance.

For one, static subclasses become equivalent for purposes of casting at least because the addition to state can always be assumed to be zero. The base class and the static class have the same dynamic type. This allows casting in both directions from base to subclass and from subclass to base without a type conversion and thus without any performance penalty as no runtime representation exists for an instance of the static type.

Furthermore, in addition to providing a more custom manner of interacting with data and other classes, static inheritance provides a mechanism (e.g., type safe wrappers) for enhancing static type checking for a language. In particular, static subclasses can allow expression of assumptions about an underlying document that is to be queried. These assumptions provide context for data to be retrieved and provide a way to strongly type an otherwise unsafe manner of accessing data.

According to one aspect of the invention, a system is provided for extending a class. The system includes an input component that receives a static subclass component. The static subclass component can include, among other things, static fields and methods that extend a base class to provide more custom functions for a particular context. At the same time, these fields and methods are required not to be additive with respect to the state of the base class. Once the static subclass component is received, it can be exposed via an extension component for use thereof.

In addition to being manually created or specified by a programmer, for instance, static classes can be automatically generated in accordance with another aspect of the invention. More specifically, a generation system can receive a data schema or some other context and generate one or more static subclasses to facilitated access to data or a more customized interaction.

According to another aspect of the invention, static subclass components can be utilized at least as part of an interface or API (Application Programming Interface) between programmatic components and some other entity or data source.

Further yet, a type checking system is disclosed in accordance with another aspect of the invention. The type checking system can verify that static subclasses do not extend base class state and furthermore can statically type check code declarations or types and interactions there between.

According to a particular aspect of the subject invention, static subclasses can be employed in a programming language to facilitate strongly typed and custom queries of XML data or documents.

Finally, it should be noted and appreciated that static subclasses need not provide additional methods or extend functionality. According to one aspect of the invention, a static type can be employed to enable type aliasing. In such a scenario, the static subclass would not need to includes any static methods, fields or properties, or any instance methods or properties.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

BRIEF DESCRIPTION OF THE DRAWINGS

The foregoing and other aspects of the invention will become apparent from the following detailed description and the appended drawings described in brief hereinafter.

DETAILED DESCRIPTION

Figure 1:
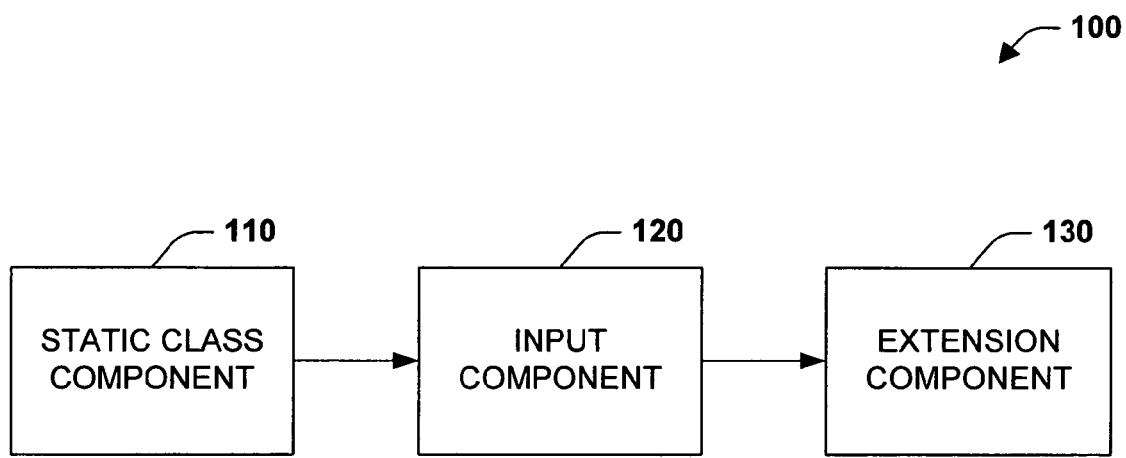
FIG. 1 is a block diagram of a class extension system in accordance with an aspect of the subject invention.

The present invention is now described with reference to the annexed drawings, wherein like numerals refer to like or corresponding elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the present invention may be implemented as a method, apparatus, or article of manufacture using standard programming and/or engineering techniques to produce software, firmware, hardware, or any combination thereof to control or direct a computer to implement the disclosed invention. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the subject invention.

Artificial intelligence based systems (e.g., explicitly and/or implicitly trained classifiers) can be employed in connection with performing inference and/or probabilistic determinations and/or statistical-based determinations as in accordance with one or more aspects of the subject invention as described hereinafter. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Referring initially to FIG. 1, a class extension system 100 is depicted in accordance with an aspect of the subject invention. Class extension system 100 can include one or more static subclass components 110, an input component 120 and an extension component 130. Static subclass component 110 is a special type of derived class as will be described in further detail infra. Input component 120 is operable to receive and/or retrieve one or more static subclass components 110. Furthermore, it should be appreciated that input component 120 may also be employed to facilitate specification of or creation of a static subclass component. For example, input component could correspond to a text editor in an integrated design environment (IDE). Upon receipt or creation of the static subclass component 110, the input component 120 can provide the subclass component 110 to the extension component 130. Extension component 130 can then expose, among other things, the static subclass component 110. Exposure of the subclass component 110 makes it available for use or reference, for instance, by other programmatic entities (e.g., objects, classes, functions, interfaces . . . ). The static subclass component 110 can provide additional functions or behaviors associated with a super class object. However, unlike conventional subclasses a properly formed or typed static subclass component cannot and does not extend or add super class object state.

Figure 2:
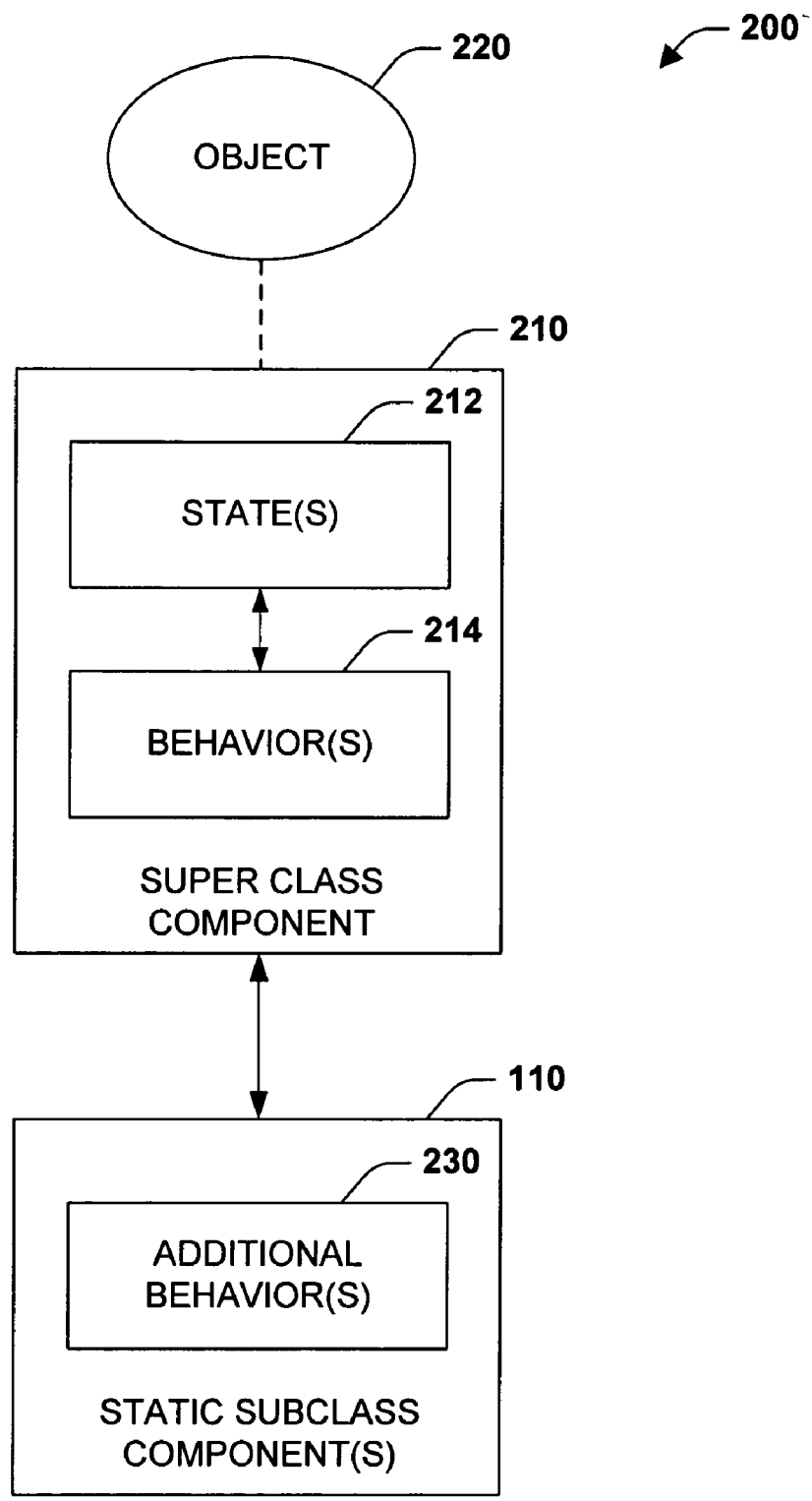
FIG. 2 is a block diagram of a class system in accordance with an aspect of the subject invention.

Turning to FIG. 2, a class system 200 is illustrated in accordance with an aspect of the subject invention. Class system 200 includes a super class 210, and object 220 and a static subclass component 110. In object oriented design technologies, objects 220 are often modeled or described by classes or software objects. Here, object 220 is modeled by class 210. An object can be some real world object or an abstract object. Objects can have both state and behavior. For example, if an object models a bank account the state can include the type of account (e.g., savings, checking), the account number, and the balance, among other things. The behavior includes functions or methods that operate on the object state. For instance, behavior can include opening an account, closing an account, incrementing the balance upon deposit, and decrementing the balance upon withdrawal. Accordingly, a class 210 that models an object must also include a state component 212 and a behavior component 214. State can be maintained by one or more variables (also known as instance variables), wherein variables are identifiers for data items stored on a computer readable medium. Behavior can be represented in a class 210 by methods (also known as instance methods). Methods can correspond to functions or algorithms associated with a class. In most classes, there is typically at least one method (e.g., virtual method) that modifies or adds state.

Classes can be defined in terms of and/or depend from other classes. In object-oriented programming, this is referred to as inheritance. A subclass (also referred to as a child class or derived class) inherits from a super class (also called a base class or parent class). Relationships are not limited to a single super class and a subclass there can be many combinations thereof that can define hierarchical relationships. The subclass inherits the state and methods of the super class. However, subclasses are not limited to inherited state and methods. They may also provide there own state and methods. Here, class 210 is identified as super class as it has a subclass 110 that inherits from class 210. In conventional inheritance, a subclass is able to and likely extends both the state and the behavior(s) of the super class. In the previous bank account example, a subclass can correspond to a more specific type of account such as an interest bearing checking account, which includes instance fields and methods that calculate interest and modify the account balance state of the super class by adding interest thereto. Alternatively, a class 210 can be defined as bank account with a virtual method interest. A virtual method depends on dynamic or runtime type. Thus, subclasses 110 can be defined for one or more specific types of accounts such as a savings and checking account. Each account can have its own method for calculating interest that can override the virtual interest method. Thus, conventional inheritance supports virtual methods, among other things, that depend on a runtime type. Conversely, the subject invention discloses what can be referred to as static inheritance, which does not introduce a new runtime or dynamic type. Static inheritance provides for a restrictive class inheritance relationship that provides distinct benefits not previously contemplated or appreciated by the object oriented programming community (as described further in later sections). In accordance with an aspect of the subject invention, subclass 110 only provides additional behaviors 230. Subclass 110 does not extend the state of the super class. Stated differently, subclass 110 is a static class, which does not add state, and inherits from super class 210.

Figure 3:
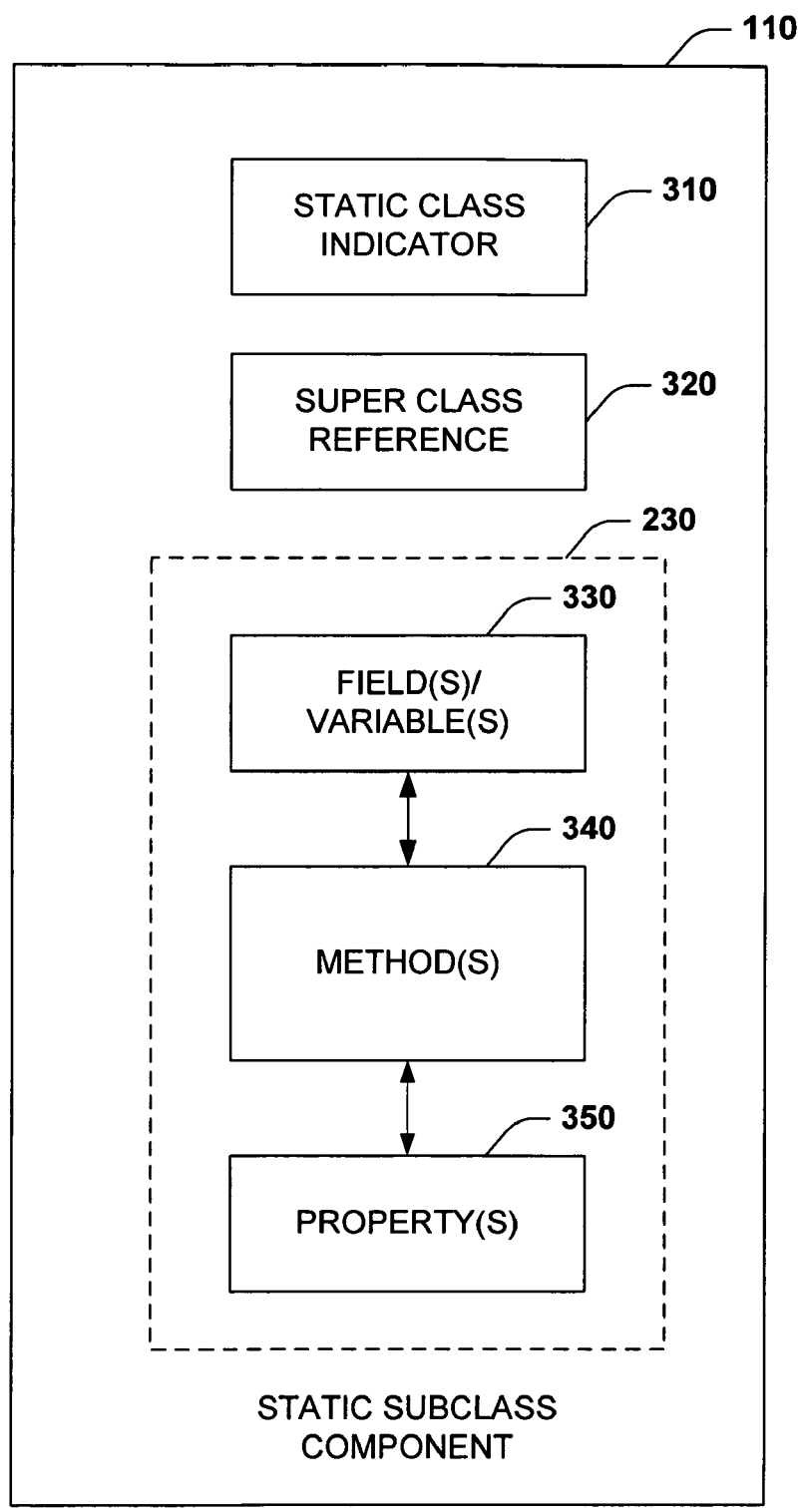
FIG. 3 is a block diagram of a static subclass component in accordance with an aspect of the subject invention.

Turning to FIG. 3, a static subclass component 110 is illustrated in further detail in accordance with an aspect of the subject invention. Static class component 110 can include a static class indicator 310, super class reference 320, and optionally behaviors 230 defined by zero or more static fields/variables 330, zero or more static or instance methods 340, and/or zero of more static or instance properties. Static class indicator 310 identifies the subclass component 110 as static. This can be accomplished, for instance, by specifying a keyword such as "static" or some other indicia prior to the subclass name. The super class reference 320 points, refers, or otherwise identifies a base class from which the instant subclass component inherits. By way of example and not limitation, the super class reference 320 can specify the relationship as an extension such that a subclass extends a super class (e.g. subclass name: super class name). Behavior or functionality 230 can be specified by employing zero or more of fields/variables 330, methods 340, and/or properties 350. A field represents a variable associated with an object or class. Fields 330 can correspond to static fields (alternatively referred to as class variables) where data entities are associated with a class as a whole and not to particular instance or state of an object. Static fields or variables 330 can be defined at least in part to assist methods 340. A method implements an action of function that can be performed by an object or class. Similar to fields 330, methods 340 can correspond to static or non-virtual instance methods that provide a mechanism to perform some action, for example as defined by a sequence of instructions. Unlike traditional methods, static methods 340 are not associated with nor do they interact with any object instance. They purely perform class functionality alone or in conjunction with fields 330. Additionally, instance methods can be employed by the static subclass component 110 as they will not affect state. Furthermore, static subclass component 110 can include static or instance properties 350. Properties provide access to a characteristic of an object or class. Properties are an extension of fields or a special kind of method. Unlike fields, properties do not denote storage locations. Rather, properties have accessors that specify statements to be executed when their values are read or written. Static or instance properties like static or instance methods do not extend state. Accordingly, static subclass component 110 can include static fields, methods, and properties, and/or instance methods or properties, as these class members do not extend the subclass' dynamic type or state.

It should be noted that the data structures described in both FIGS. 2 and 3 can be embodied or stored on a computer readable medium to support execution thereof by a computing device. In particular, the medium can include a class (e.g., base, super, parent . . . ) data structure as well as a static subclass structure that extends the behavior of the class structure without extending class state. The static subclass can then include further structures such as static fields/variables, static or non-virtual instance methods, and/or static or instance properties to generate the extended behavior. The class and related static subclass can thus have the same dynamic type, which can facilitate casting between the class and subclass (e.g., up cast, down cast) without runtime performance penalties associated with type conversion, for instance. The static subclass could also include data structures referencing the class and indicating that the subclass is in fact static. It should be appreciated that many other structures may be stored on a computer readable medium in conjunction with providing static inheritance and utilizing this feature (e.g., calls to static subclasses . . . ). Furthermore, the static subclass need not extend behavior or functionality utilizing one or more other structures. In fact, the static subclass alone can simply provide for type aliasing. For example, assume a base class integer for numbers. One might want to distinguish between feet and meters. Accordingly, a static subclass component feet and/or meters can be defined, which derives from the class integer. In this situation, no additional functionality was introduced via fields, methods, or properties. The static subclass simply provides a new type that is an alias for integer.

The nature of static inheritance provides significant advantages not previously contemplated or appreciated. First static inheritance may be available when convention inheritance is not. For example, conventional subclass inheritance may not be available when a base class has been sealed or designated not extensible. Moreover, with static inheritance the base and special subclasses can be treated as equivalent from a type-casting point of view. This is possible because static inheritance does not add new fields or instance variables, add/override virtual methods of the base class, and does not introduce a new dynamic type, only a new static type that equivalent or the same as the dynamic type of the base class. Essentially, the internal state of a class or class instance remains unchanged with static inheritance. Static inheritance provides for static subclass 110, which can add one or more behaviors on top of an existing class or simply provide a new type alias. As a result, casting from base class 210 to such a static subclass 110 (i.e., down casting, narrowing conversion) is possible at least because static inheritance does not introduce a new dynamic type or change any of an object's behavior. Casting from a static subclass 110 to its super class (i.e., up casting, widening conversion) is also possible for the same reason—no change in an object's state or behavior will be effectuated. Static inheritance can thus provide some convenience in a custom context that is not needed or provided in a more generic context described by a base class. Moreover, the subject invention can enable introduction of customized object notations in local programming application contexts without any runtime overhead (e.g., conversion, cast check . . . ) and in full consistency with statically strongly typed style of programming (as described in further detail infra).

For purposes of clarity and understanding and not limitation, consider the following exemplary code snippets concerning Cartesian and polar coordinates.

class Point {public Point(double x; double y) {this.x=x; this.y=y;} public double x; public double y; }

Class Point describes a base class 210 or generic level of working with points in a rectangular or Cartesian coordinate system. The following code segment shows a specification of an exemplary static subclass 110 called PolarPoint that extends class Point.

static class PolarPoint: Point {public PolarPoint(double a, double r): base(r*Math.Sin(a), r*Math.Cos(a)) {} public Angle {get {return 1/Math.Tan(y/x);}} public Radial {get {return Math.Sqrt(y*y+x*x);}} PolarPoint Rotate(double angle) {return new PolarPoint(this.Angle+angle, this.Radial); } }

This static subclass 110 provides a custom view of the same points identified by the base class 210. In particular, the static subclass enables the same points to be treated as polar coordinates. As shown, the subclass includes two static fields or properties Angle and Radial as well as one new method Rotate. Following this static subclass is the Main class providing various calls to the super class and static subclass to illustrate, inter alia, class calls and conversion between class types.

public void Main ( ) {PolarPoint p=new Point( ); Point Rotated=p.Rotate(30); }

In the first assignment, a new Point is created so an implicit cast to Point can be made. The assignment to variable p of type Polar Point causes a cast to PolarPoint. In the second assignment, p.Rotate is implicitly cast to Polar type. The assignment to the variable Rotated causes a cast to type Point. Thus, type casting between a static subclass and its parent generic class can be easily specified and executed. It should be noted and appreciated from the example that the PolarPoint class is not implemented merely as a conventional subclass. If this were so, than a run time conversion for the Rotate method would be required in Main( ). Instead, the class is implemented as static subclass, so that type conversion on entry/exit from Rotate method does not require any actions at run time as they have the same dynamic type and therefore there is no performance penalty for conversion, for example.

The aforementioned example demonstrates a context where a Polar interpretation of points are preferred rather than a Cartesian interpretation. The code is specified as if the object has Angle and Radial properties, while the "real" base object does not have such properties. This is merely one exemplary application of aspects of the subject invention. Those of skill in the art will come to recognize and appreciate many other uses or contexts of the various inventive aspects disclosed herein, all of which are considered within the scope of the invention. For example, static subclasses can be added to conventional programming languages (e.g., C#, Visual Basic, Java . . . ) to facilitate support for XML (extensible Markup Language) queries.

XML is a data format language that provides for text markup or tags describing data. In essence, XML enables the creation of customized data tags that facilitate definition, transmission, validation, and interpretation of data. Currently, XML is becoming a standard for sharing data over the Internet between both applications as well as organizations. XML is a broad term that is often utilized to characterize a family of technologies based on the World Wide Web Consortium (W3C) Recommendation including but not limited to XSL (XML Stylesheet Language), XSLT (XSL Transformations), XML DOM (XML Document Object Model) and XPath (XML Path Language). Generally speaking, XSL and XSLT provide for data transformation and presentation. XML DOM provides for building a tree structure from an XML document representing hierarchical relationships and facilitating interaction with data utilizing other technologies such as XPath. XPath provides a filtering mechanism such that only data a user specifies as interesting will be returned. XPath provides such filtering of an XML document by receiving a specification of a location(s) in the form of nodes alone or in combination with predicates to further refine or filter the returned data.

The growing popularity of XML as a data storage format generates a need to support XML features in primary programming languages. It is typical in an XML world to be in a situation where some data is created elsewhere as a generic XML node, but in the context of a particular application such data has a very specific meaning (e.g., in accordance with a custom schema) and needs an appropriate mechanism to enable manipulation (e.g., retrieval, filtering . . . ) thereof. Furthermore, it is desirable that such a mechanism be statically typed. One way of solving such a problem would be to create a custom static class with a bunch of methods that take the generic object as the explicit first parameter. Alternatively, these helper methods could be grouped into a new subclass, for instance so that the object instance would appear as the implicit "this" parameter. Unfortunately, creating an ordinary subclass is often impossible because the class is sealed or designated as not extensible. Hence, a static subclass can be introduced to extend programming languages to support static inheritance. This fits very well into conventional language structure without having to significantly alter data constructs and introduce a plurality of new keywords. Thus, the subject invention can be thought of as a semantic extension that according to one aspect of the invention allows resolution of a notational problem that is very important in the context of XML data processing.

By way of example and not limitation, one of the features that users of programming languages expect is the ability to write XPath-like expressions in a natural and strongly typed manner. For instance, uses may want to write the XPath expression "my: Customer/ns: Order/@data as Customer.Order.Date." One way of achieving this would be by adding dynamic dispatch to a programming language. However, this would eliminate all static typing. Furthermore, dynamic dispatch does not solve the problem of XML namespace support. In particular, conventionally identifiers in programming language names do not have namespace prefixes. More specifically, the type System.Xml.XmlNode can represent any node in a DOM tree. When a user's code accepts, retrieves, or receives an instance of Xml.Node it in most cases knows that this is not an arbitrary XML node, but has some structure or even corresponds to some schema. For example, the node may correspond to Customer, which has ns: Name and ns: children. Users could access both children with a SelectSingleNode ( ) method by passing it the string name of the respective children. Therefore, the DOM tree by itself provides "dynamic dispatch" functionality. What are missing are strong typing and a way to access these dynamic properties as regular language members. Static inheritance as disclosed herein can solve these and other problems.

Consider the following code snippets in conjunction with FIG. 3 describing a static subclass component 110.

static class Customer: System.Xml.XmlNode {CustomerName Name {get {return this. SelectSingleNode("ns: Name");}} Organization Organization {get {return this. SelectSingleNode("ns:Organization");}}} static class CustomerName: System.Xml.XmlNode {string FirstName {get { return this. SelectSingleNode("@FirstName").ToString( );}} string LastName {get {return this. SelectSingleNode("@LastName").ToString( );}}} static class Organization: System.Xml.XmlNode {string Name {get {return this. SelectSingleNode("@Name").ToString( );}}

Address Address {get {return this. SelectSingleNode("Address");}}}

Provided above are three static subclasses Customer, CustomerName and Organization. Each static subclass extends or inherits from System.Xml.XmlNode, the super class. Static subclass Customer includes two methods Name of type CustomerName and Organization of type Organization. Static subclass CustomerName provides two methods FirstName and Last Name, while static class Organization includes two different methods, Name and Address. The collection of static subclasses 110 therefore describes a particular data schema where each class is a static subclass of an XmlNode. Moreover, the static subclasses enable static type checking in accessing such data. The SelectSingleNode( ) is an accessor to some internal state which is not available as a strongly typed member. Static inheritance allows one to convert this unsafe way of accessing data into a strongly typed manner. Consider, for instance, FirstName in the static subclass Customer. Here, First name is known to be a string and is specified as such utilizing the accessor SelectSingleNode("@FirstName").ToString( ). This enables data access to be safe and strongly typed.

Using the above static subclasses, one can program against XML using conventional member-access notation. For example:

Customer c=... load XmlNode . . . ;

CustomerName n=c.Name;

Console.WriteLine("First={0}, Last={1}", n.FirstName, n. LastName);

The types Customer, Name, and the like guide a programming language compiler in expanding member access into calls to the proper underlying Select SingleNode methods. Thus, the set of XML classes can provide convenience in data access as well as strong typing based on the knowledge of the data schema.

Figure 4:
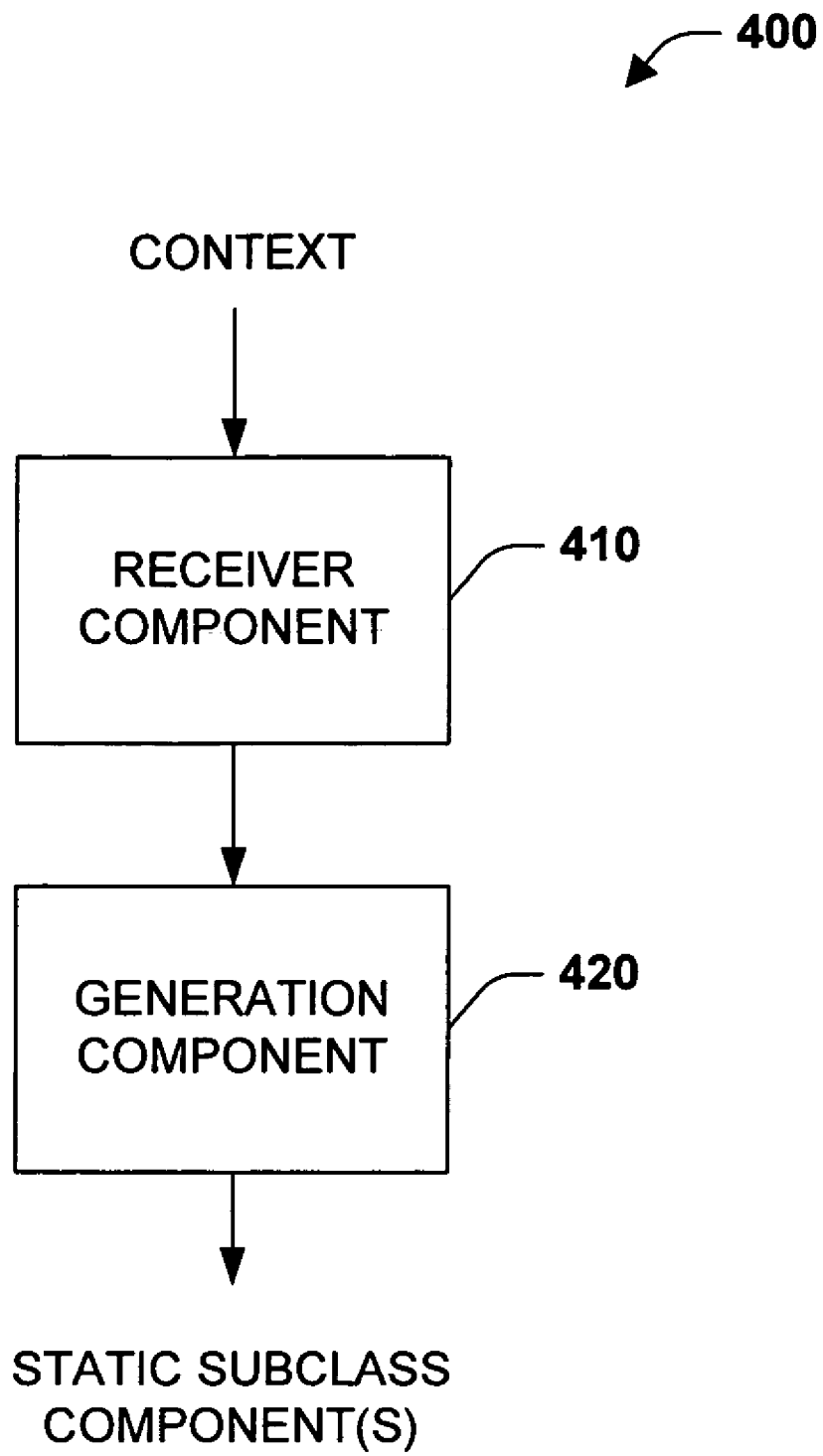
FIG. 4 is a block diagram of a static subclass generation system in accordance with an aspect of the subject invention.

Turning to FIG. 4, a static subclass generation system 400 is depicted in accordance with an aspect of the subject invention. Although, static subclasses can be generated manually via programmer specification, system 400 provides for an automatic or a substantially automated mechanism of static subclass generation. System 400 can include a receiver component 410 and a generation component 420. Receiver component 410 can receive or retrieve a particular context in the form of a data schema (e.g., XML schema), for instance. The schema can provide information concerning data, data relationships, data types, and the like. Upon receipt of a schema, receiver component 410 can provide or present the schema to generation component 420. Generation component 410 can analyze the data schema and generate one or more static subclass components in accordance therewith. It should be noted that although generation component 410 can employ conventional logic to generate subclass components, the present invention also contemplates and appreciates that a variety of expert systems, artificial intelligence and/or machine learning can be employed by the generation component to intelligently and/or efficiently produce static subclass components. Such artificial intelligence can include but is not limited to one or more of Bayesian methodologies (e.g., networks, classifiers . . . ), neural networks, support vector machines, linear and non-linear regression, and statistical classifiers. Thus, the generation component can infer, in accordance with an aspect of the invention, the proper static class to generate based on context as well as other factors.

Figure 5:
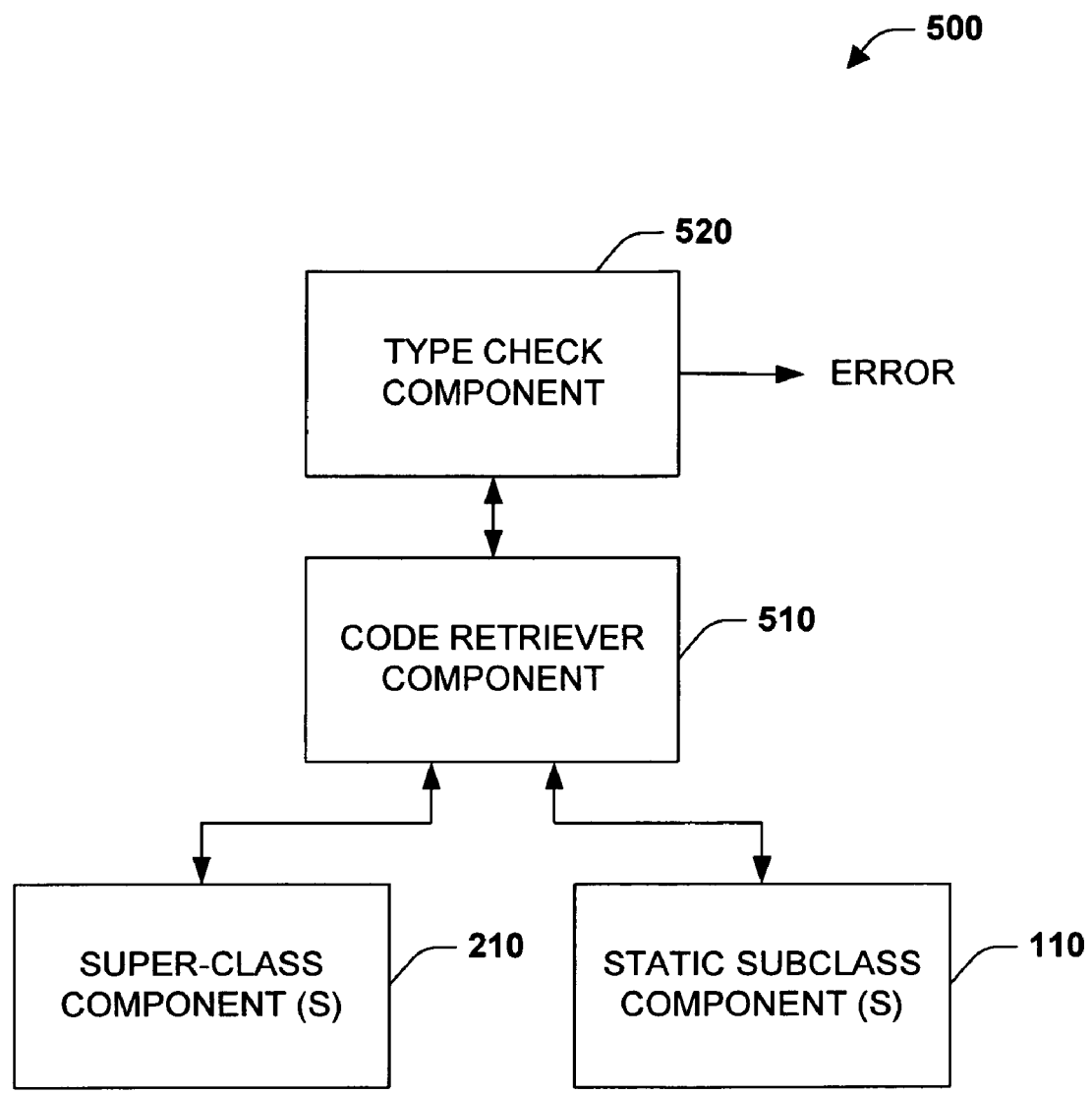
FIG. 5 is a block diagram of a type check system in accordance with an aspect of the subject invention.

FIG. 5 illustrates a block diagram of a type check system 500 in accordance with an aspect of the subject invention. Because static inheritance is effectuated utilizing static subclasses that can modify behavior but do not extend state, a type system must detect if this restriction is satisfied or violated. Type check system 500 includes a code receiver component 510 and a type check component 520. Code receiver component 510 can receive and/or retrieve one or more super class components 210 and static subclasses 110. Code receiver component 510 can retrieve such components from a specified computer program, for example, during parsing and/or compilation. Received/retrieved class components 210 and 220 can then be provided to type check component 520. Type check component 520 can subsequently verify that the static subclass actually extends or inherits from a super class and that it does not extend the state of the super class. In particular, the static subclass component's super class reference can be checked to identify the extended base class. The static subclass component's fields, methods, and/or properties can then be checked to ensure that they in fact do not extend or attempt to extend the state of the super class. If this is the case, then the subclass passes the check. If not, then the type check component 520 can generate and error indicating failure.

Figure 6:
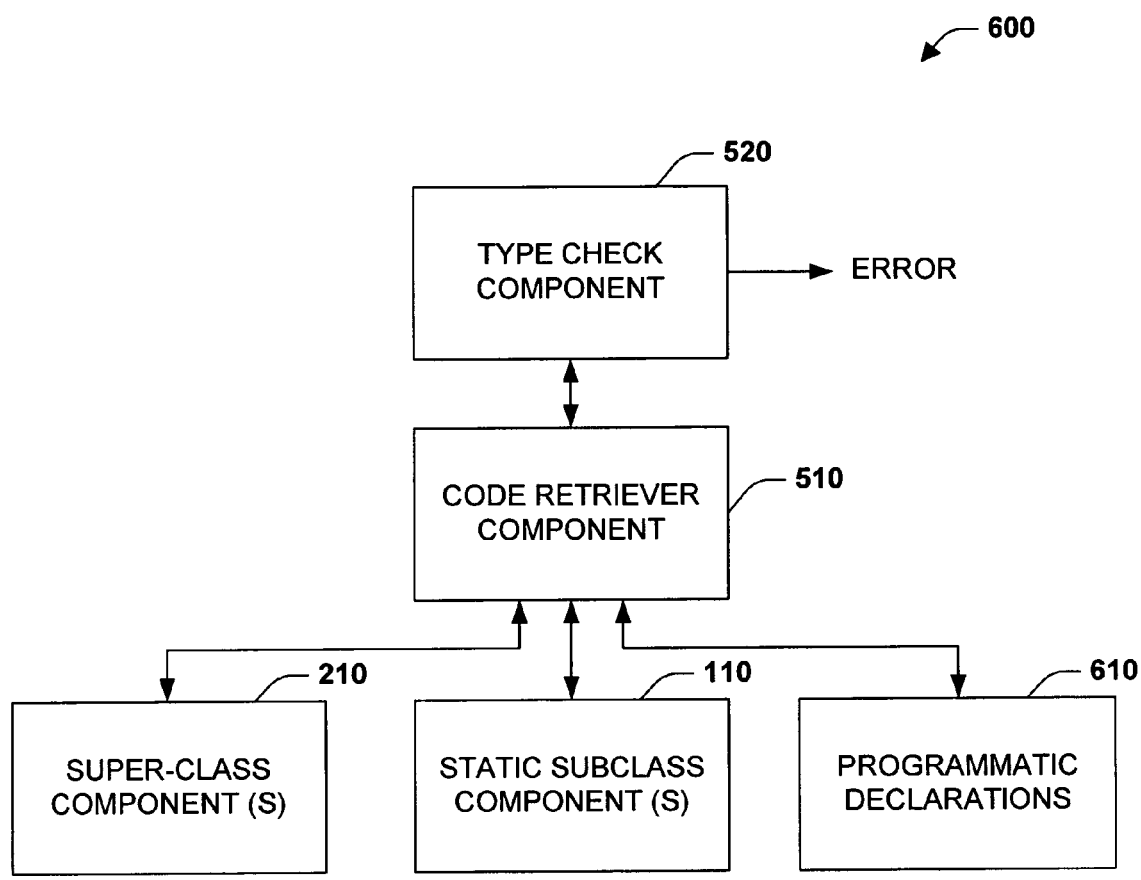
FIG. 6 is a block diagram of a type check system in accordance with an aspect of the subject invention.

FIG. 6 depicts another type check system 600 in accordance with an aspect of the invention. Similar to system 500, system 600 includes a type checker component 520 that receives input from code retriever component 510. Code retriever component 510 can retrieve super class components 210, static subclasses 110, as well as code declarations 610. In addition to verifying that static subclasses inherit from a super class and do not add to the state of such super class, the type check can statically type check code declarations. Code declarations as used herein refer to any use, call, declaration, assignment or the like involving classes including but not limited to super classes and static subclasses, objects, and other programmatic constructs. For example, PolarPoint p=new Point( ) is one example a code declaration. The type checker component 520 can check such declarations against declared classes and other constructs. In the instant example, the type check component can verify that Point (the implicit type of new Point( )) is compatible with they type PolarPoint associated with the variable assignment. If PolarPoint is a static subclass that inherits from Point then the declaration is acceptable because the types can be considered equivalent. If PolarPoint does not extend Point or Point is designated as non-extendible and PolarPoint is a conventional subclass, then the type checker component 520 can generate a type error.

Figure 7:
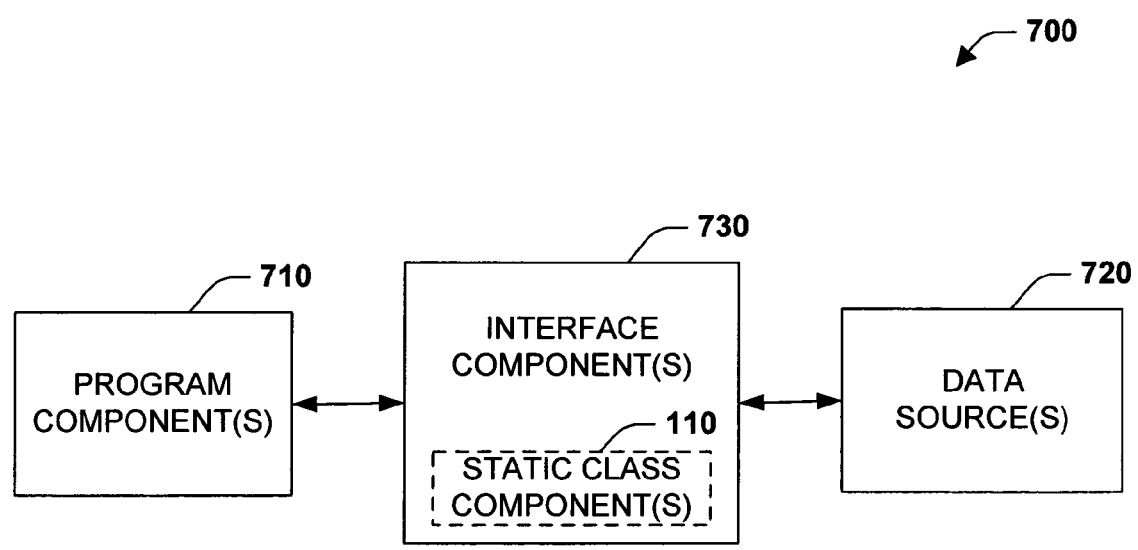
FIG. 7 is a block diagram of a data interaction system in accordance with an aspect of the subject invention.

Turning to FIG. 7, a data interaction system 700 is illustrated in accordance with one aspect of the invention. System 700 facilitates data interaction including but not limited to retrieving, receiving, storing, and otherwise manipulating data. System 700 can include one or more program components 710 (e.g., programs, routines, executable instructions, programmatic constructs . . . ) that need to interact with one or more data sources 720. These data sources 720 may be provided in different formats. In accordance with one aspect of the invention, the data sources can be schematized for example as an XML document. Interface component 730 enables communications between program components 710 and data sources 720. According to an aspect of the invention interface component 730 can include one or more static class components 110 as well as other class components (e.g., base class). The static class components 110, as described supra, can provide supplemental functionality related to a specific context. In this instance, the static class components 110 can be employed to interact with data from data sources 720. According to a particular aspect of the subject invention, the interface component 730 and associated static class components 110 can be part of an application-programming interface (API) within a computer program. Furthermore, the data source 720 can be an XML document such that the interface component 730 via static class components 110 can retrieve and otherwise interact with XML data from within a program.

In view of the exemplary systems described supra, a methodology that may be implemented in accordance with the present invention will be better appreciated with reference to the flow charts of FIGS. 8-12. While for purposes of simplicity of explanation, the methodology is shown and described as a series of blocks, it is to be understood and appreciated that the present invention is not limited by the order of the blocks, as some blocks may, in accordance with the present invention, occur in different orders and/or concurrently with other blocks from what is depicted and described herein. Moreover, not all illustrated blocks may be required to implement the methodology in accordance with the present invention.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 8:
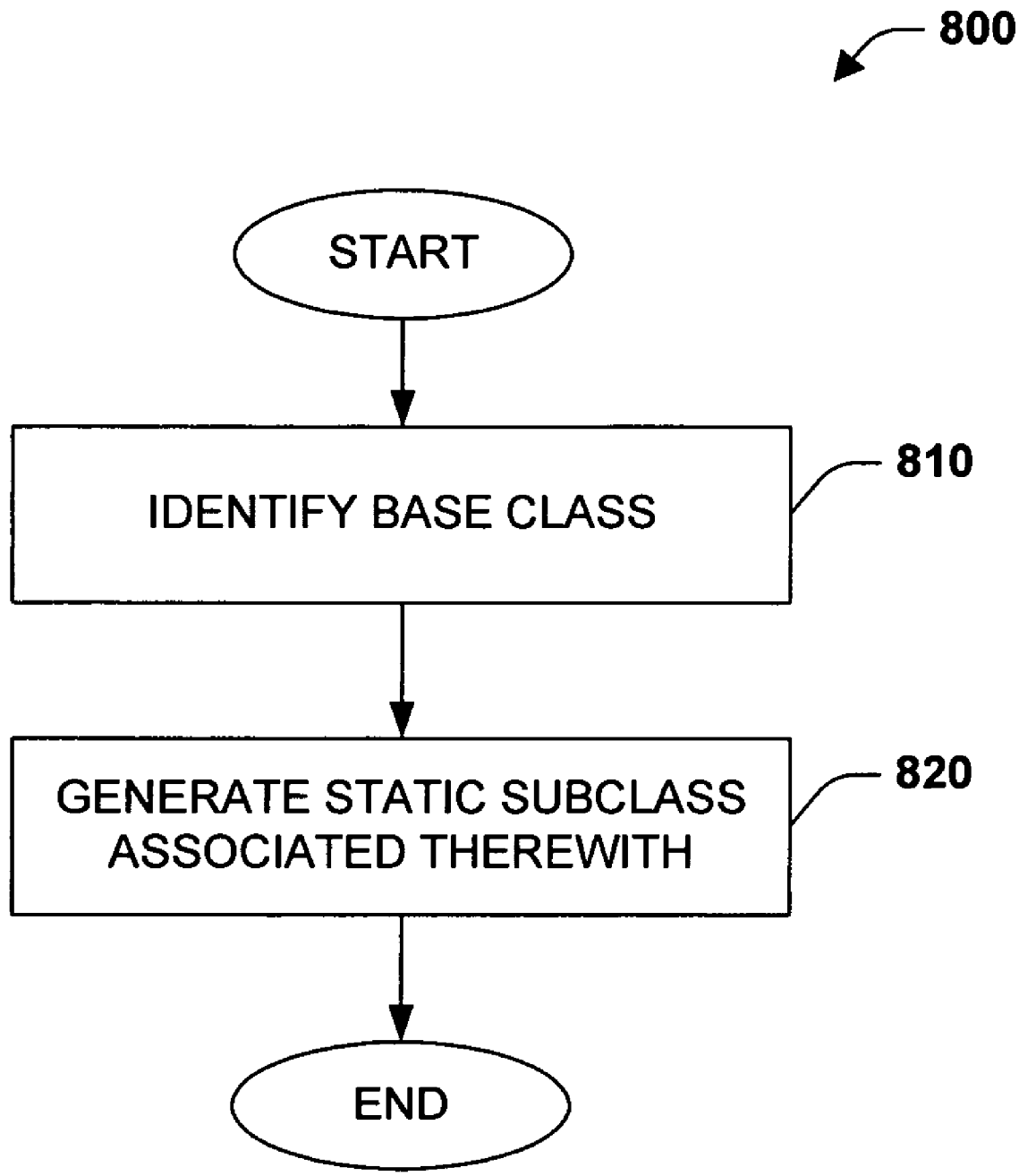
FIG. 8 is a flow chart diagram of a method of extending a class in accordance with an aspect of the subject invention.

Turning to FIG. 8, a method of extending a class 800 is depicted in accordance with an aspect of the invention. At 810, a base class is identified. The base class provides some generic functionality, which is sought to be extended or supplemented for some particular context. Once a base class is identified, a static subclass can be generated that extends the functionality of the base class, at 820. A static subclass component is a subclass that can provide, inter alia, static fields and methods associated with a particular context or data schema. The static subclass component can be generated by a programmer or user via manual specification. Additionally or alternatively, the static subclass component can be produced from a generation system, for example, that automatically or semi-automatically generates static subclasses in response to a received or retrieved schema. The super class associated therewith can thus be extended with the subclass functionality. It should be appreciated that the extension is limited to fields, methods, and properties that do not extend or add to the state of the super class from which it inherits. Furthermore, it should be appreciated that mere generation of a static subclass without any fields, methods, and properties can be one form of base class extension. In this instance, the static subclass can define a type alias for the base class. The method 800 of extending class functionality can also be referred to as static inheritance. Static inheritance differs from conventional inheritance at least in that inherited subclasses extend or are capable of extending both the state and behavior of the super class.

Figure 9:
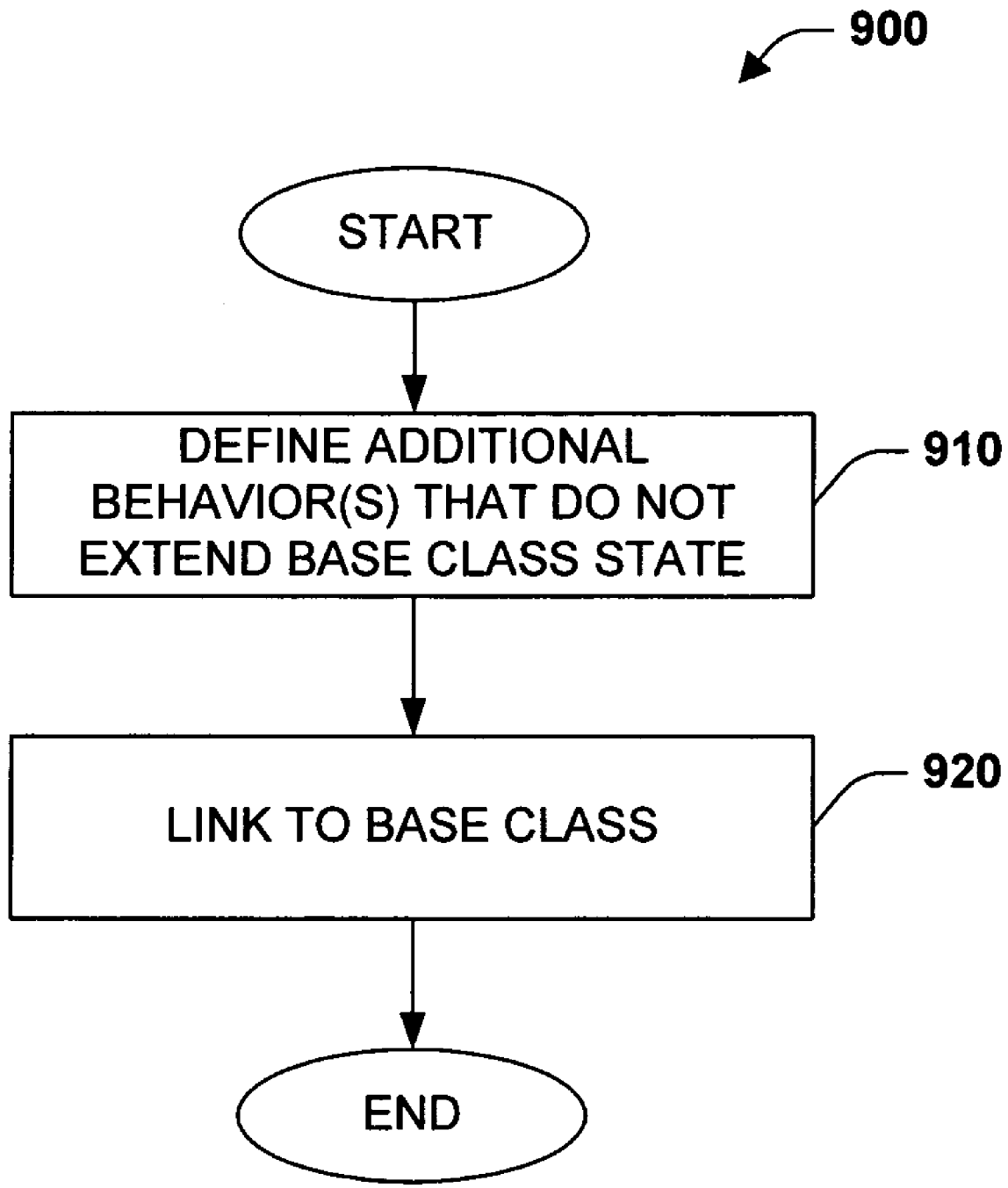
FIG. 9 is a flow chart diagram of a method of extending a class in accordance with an aspect of the subject invention.

FIG. 9 illustrates a method of extending a class in accordance with an aspect of the subject invention. At 910, additional behavior(s) are defined that do not extend the state of a base class. According to one aspect of the invention, these additional behaviors can provide supplemental layer(s) of functionality related to a particular context. The additional behaviors can be defined in one or more static subclasses. A keyword such as "static" indicates that the subclass will not affect a parent class state. Additional behaviors can be defined or specified within a subclass in terms of zero of more fields and one or more methods. As mentioned, these additional behaviors can provide functionality related to a particular context. Hence, a programmer can specify additional behaviors in a program based on a particular problem space, context or schema. Furthermore, such additional behavior can be defined in static subclasses automatically based on a particular data schema(s), for example. Once this additional behavior is defined, it can be linked to a base or super class at 920. In accordance with one aspect of the invention, this can be accomplished by specifying a particular super class, which is extended, and making this functionality available for use, for example by copying generated static subclasses into code. Once the class is extended both the base class and the static subclass can be employed. It should be appreciated that one of the advantages provided herein is that the base class and the static subclass have the same dynamic type. Accordingly, casts between the base and static subclass can be performed without a runtime cost.

Figure 10:
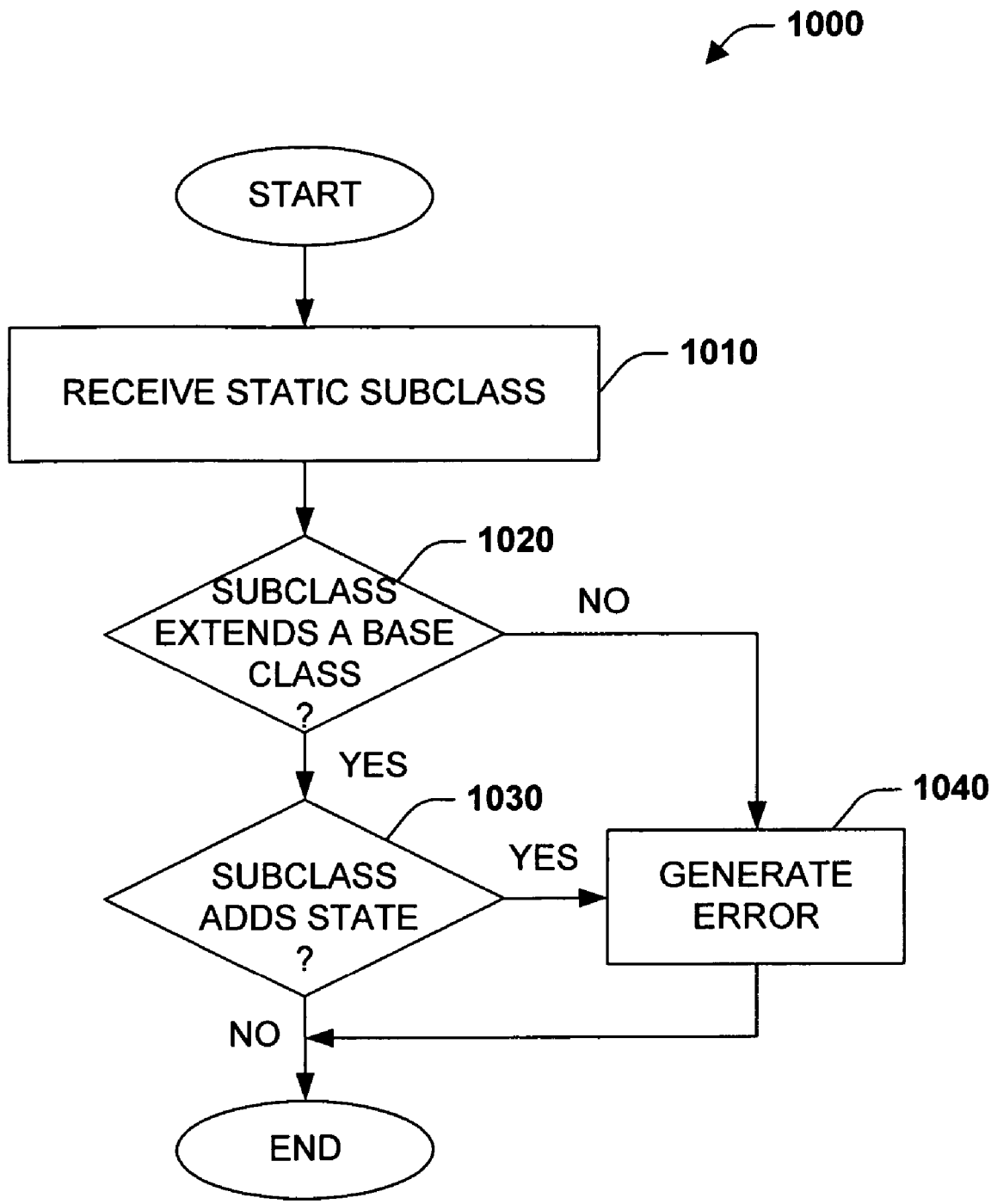
FIG. 10 is a flow chart diagram of a type checking methodology in accordance with an aspect of the subject invention.

Turning to FIG. 10, a type checking methodology 1000 is presented as a flow chart in accordance with an aspect of the subject invention. At 1010, a static subclass is received. At 1020, a check is made concerning whether the static subclass extends or inherits from a base class or other class. If the static subclass does not extend another class then the process proceeds to 1040 where an error is generated and the procedure is subsequently terminated. If the static subclass does extend another class then the process can proceed at 1030. At 1030, a determination is made as to whether the static subclass adds to the state of the base class that it extends. This can be accomplished, for instance, by analyzing both the fields and methods of the static subclass to determine if they are static. If the static subclass adds to the state of the base class that it extends, then procedure continues at 1040. At 1040, an error is generated signifying that the static subclass is not in fact static as required. Thereafter, the method terminates. If the static subclass does not extend the state of the associated base class then the process terminates successfully without error.

Figure 11:
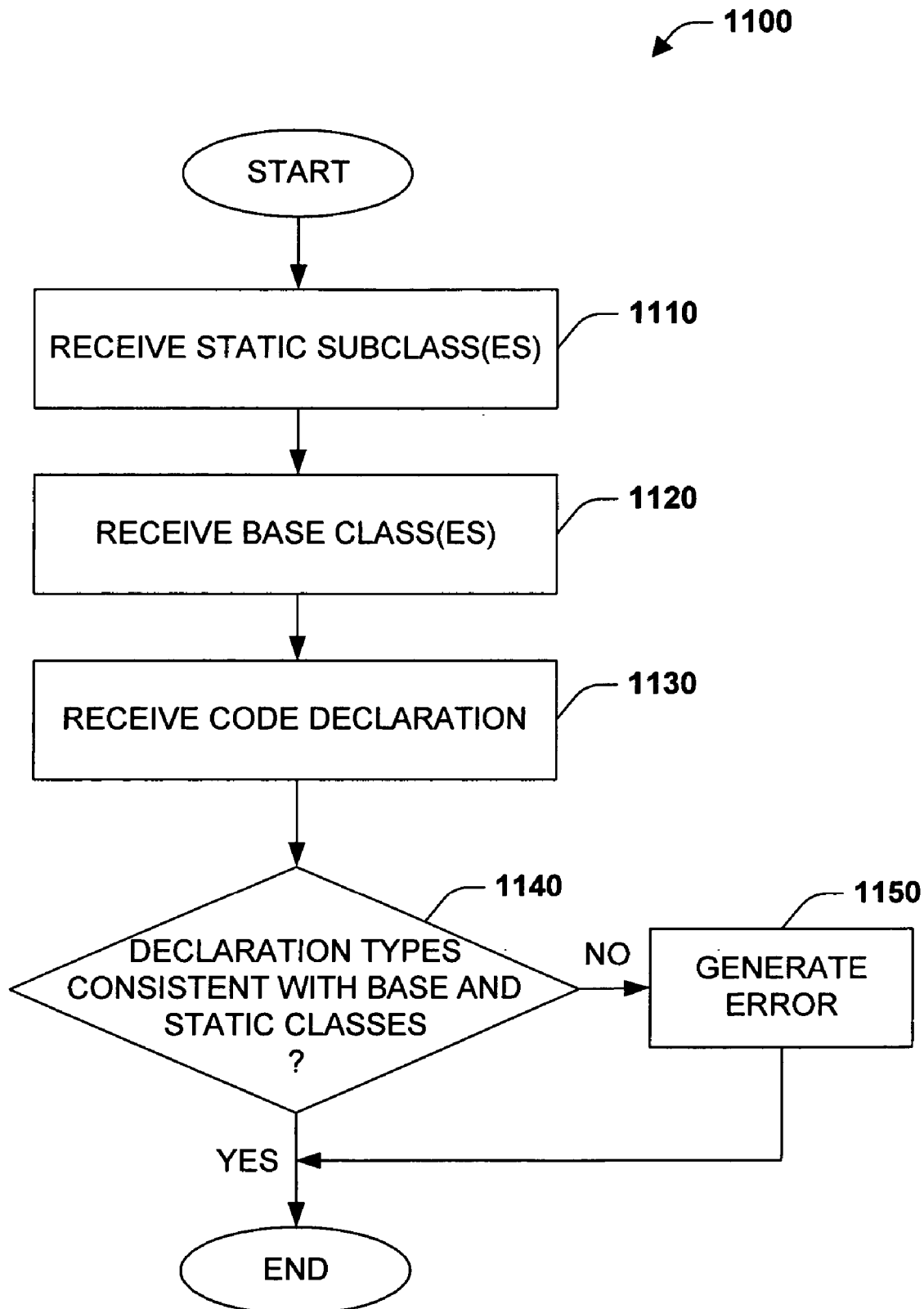
FIG. 11 is a flow chart diagram of a type check methodology in accordance with an aspect of the subject invention.

FIG. 11 illustrates another type check methodology 1100 in accordance with an aspect of the subject invention. At 1110, one or more static subclasses are retrieved. At 1120, one or more base or super classes are retrieved. Static subclasses inherit from a base or super class and provided supplemental functionality for a particular context without adding state to the base class. Both static subclasses and base classes define specific types. However, the relationship between the static subclass and the base class that it extends is such that the dynamic types are equivalent. Thus, casting from a static subclass to its inherited base class or from the base class to the static subclass requires no type conversion. With no type conversions being needed, there are no performance penalties incurred. This relationship between a static subclass and the base class that it extends is referred to as static inheritance. At 1130, a code declaration is retrieved. A code declaration can be refer to any use, call, declaration, assignment or the like involving classes including but not limited to super classes and static subclasses, objects, and other programmatic constructs. For instance, PolarPoint p=new Point( ) is one example a code declaration. At 1140, is made as to whether the declaration type(s) are consistent or compatible with defined classes including but not limited to static subclasses and base classes. If the code declaration is not consistent with the classes then, at 1150, a type error is generated and the process subsequently terminates. If, however, the code declaration is consistent with the classes then the process simply terminates successfully and/or analyzes another code declaration. In the subject example, PolarPoint p=new Point( ), a determination must be made concerning whether Point (the implicit type of new Point( )) is consistent or compatible with they type PolarPoint associated with the variable assignment. If PolarPoint is a static subclass that inherits from Point then the declaration is acceptable because the types can be considered equivalent and the process can terminate without error. However, if PolarPoint does not extend Point then a type error can be generated.

Figure 12:
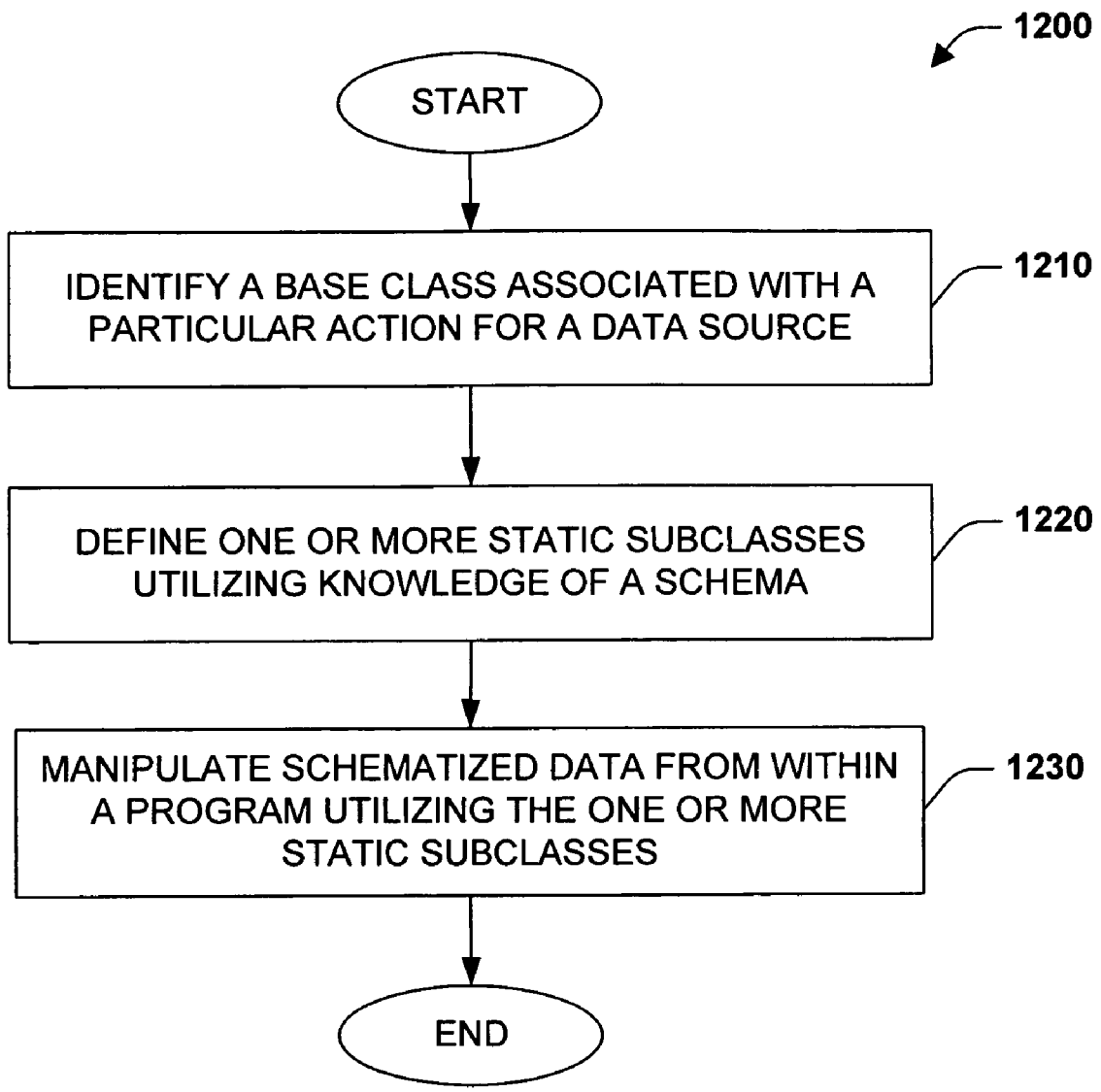
FIG. 12 is a flow chart diagram of a method of interacting with schematized data in accordance with an aspect of the subject invention.

FIG. 12 depicts a method of interacting with schematized data in accordance with an aspect of the subject invention. At 1210, a base class is identified that provides generic functionality related to a particular data source. For example, the class System.Xml.XmlNode may be the class to retrieve a generic node from an XML data source. At 1220, one or more static subclasses are defined based on knowledge of a schema (e.g., XML, XSD (XML Schema Definition) . . . ). The static subclasses can provide supplemental functionality based on the schema to facilitate interaction that is more specific therewith. The static subclasses can extend or inherit from an existing class that provides a more generic data retrieval method. It should be appreciated that such functionality or behavior can be added to another class without disturbing the class. In other words, static classes can expose additional behavior without altering the state of the parent class. For example:

static class CustomerName: System.Xml.XmlNode {string
   FirstName {get {return this. SelectSingleNode("@FirstName").ToString( );}}
string LastName {get {return this. SelectSingleNode
   ("@LastName").ToString( );}}}

The static subclasses can be defined manually, semi-automatically, and/or automatically. For example, a programmer can manually specify the static subclasses and/or employ some tools to automate the specification process. Furthermore, a system can be employed that receives at least one schema and automatically generates appropriate static subclass based on the schema. At 1230, once the static classes are defined, the schematized data can be manipulated from within a program utilizing the static classes. Thus, the static subclasses can extend a programming language to more efficiently and specifically interact with schematized data. Moreover, static subclasses facilitate static type checking related to defined static subclasses in a manner consistent with strongly typed programming languages. In other words, the static subclasses can provide type safe wrappers. For instance, a generic data accessor such as the SelectSingleNode( ) for XML data accesses some node of piece of data from a source the type of which is not known statically. The static subclass and the static inheritance associated therewith allows this unsafe manner of accessing data to become strongly typed. Specifically, the data is wrapped by one or more static subclass, which provides additional functionality related to a particular context. Instead of just retrieving a generic node of data, a particular member can be retrieved such as FirstName whose type (e.g., String) is known and specified in a static subclass.

Figure 13:
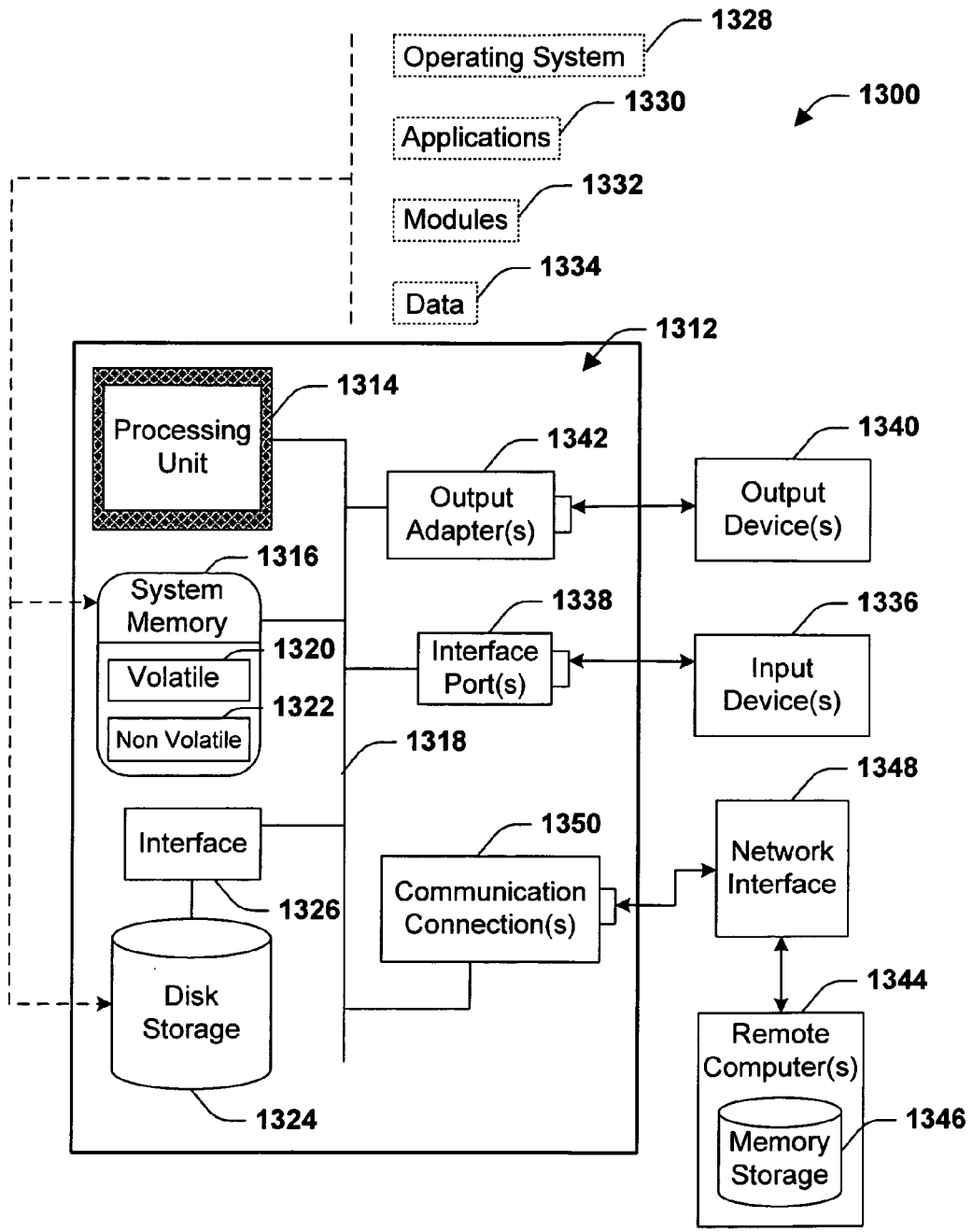
FIG. 13 is a schematic block diagram illustrating a suitable operating environment in accordance with an aspect of the present invention.
Figure 14:
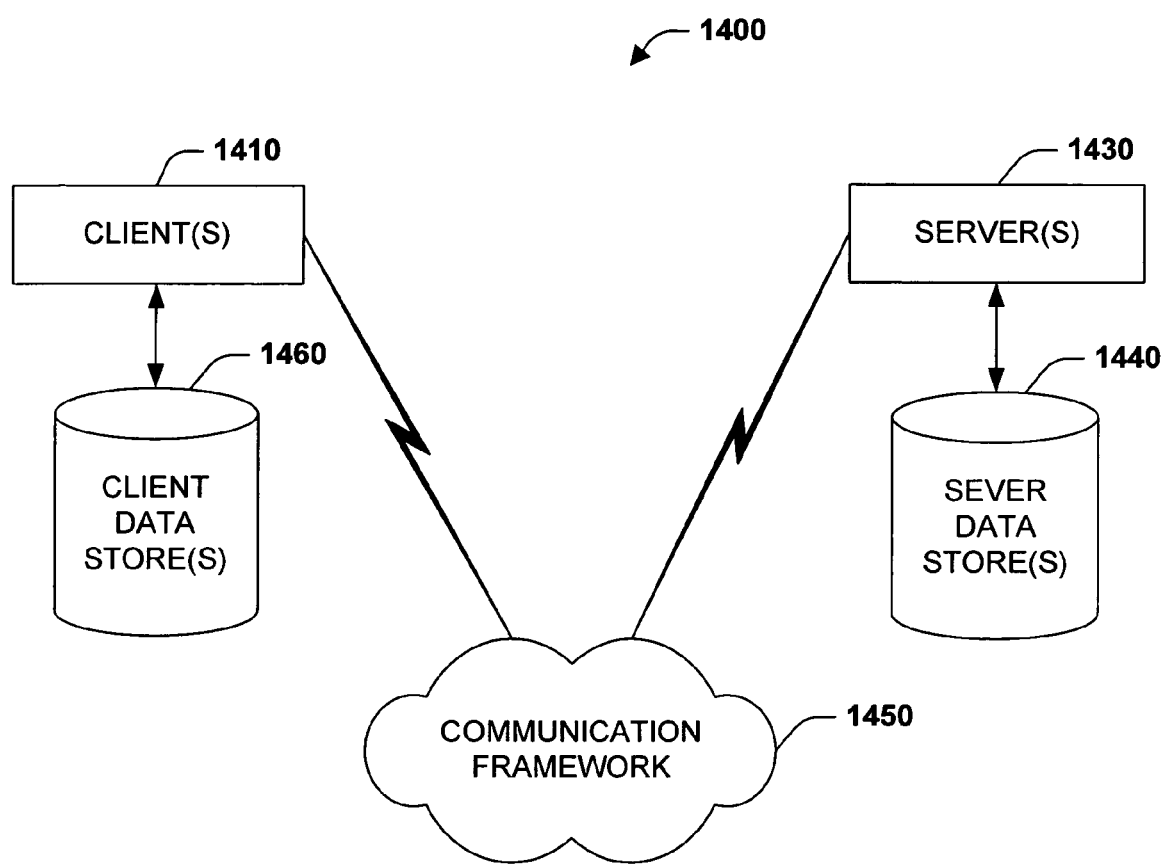
FIG. 14 is a schematic block diagram of a sample-computing environment with which the present invention can interact.

In order to provide a context for the various aspects of the invention, FIGS. 13 and 14 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practiced on stand-alone computers. In a distributed computing environment, program modules may be located in both local and remote memory storage devices.

With reference to FIG. 13, an exemplary environment 1310 for implementing various aspects of the invention includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory, controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable ROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/non-volatile computer storage media. FIG. 13 illustrates, for example disk storage 1324. Disk storage 4124 includes, but is not limited to, devices like a magnetic disk drive, floppy disk drive, tape drive, Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used such as interface 1326.

It is to be appreciated that FIG. 13 describes software that acts as an intermediary between users and the basic computer resources described in suitable operating environment 1310. Such software includes an operating system 1328. Operating system 1328, which can be stored on disk storage 1324, acts to control and allocate resources of the computer system 1312. System applications 1330 take advantage of the management of resources by operating system 1328 through program modules 1332 and program data 1334 stored either in system memory 1316 or on disk storage 1324. It is to be appreciated that the present invention can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312 and to output information from computer 1312 to an output device 1340. Output adapter 1342 is provided to illustrate that there are some output devices 1340 like displays (e.g., flat panel and CRT), speakers, and printers, among other output devices 1340, that require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems, power modems and DSL modems, ISDN adapters, and Ethernet cards.

FIG. 14 is a schematic block diagram of a sample-computing environment 1400 with which the present invention can interact. The system 1400 includes one or more client(s) 1410. The client(s) 1410 can be hardware and/or software (e.g., threads, processes, computing devices). The system 1400 also includes one or more server(s) 1430. The server(s) 1430 can also be hardware and/or software (e.g., threads, processes, computing devices). The servers 1430 can house threads to perform transformations by employing the present invention, for example. One possible communication between a client 1410 and a server 1430 may be in the form of a data packet adapted to be transmitted between two or more computer processes. The system 1400 includes a communication framework 1450 that can be employed to facilitate communications between the client(s) 1410 and the server(s) 1430. The client(s) 1410 are operably connected to one or more client data store(s) 1460 that can be employed to store information local to the client(s) 1410. Similarly, the server(s) 1430 are operably connected to one or more server data store(s) 1440 that can be employed to store information local to the servers 1430.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the terms "includes," "has," and "having" are used in either the detailed description or the claims, such term is intended to be inclusive in a manner similar to the term "comprising" as "comprising" is interpreted when employed as a transitional word in a claim.

What is claimed is:

1. A class extension system comprising:
   one or more computer processors;
   one or more computer-readable storage media; and
   computer executable instructions executing upon the one or more computer processors which instantiate:
   a static subclass generation system that automatically generates one or more static subclass components based on a schema;
   an input component that receives the one or more static subclass components that provide additional functionality to a base class without extending a state of the base class;
   a type check component that determines whether the one or more static subclass components provide additional functionality to the base class but do not extend the state of the base class by checking fields and methods of each of the one or more static subclass components to determine if they are static to ensure that each of the one or more static subclass components does not extend or attempt to extend the state of the base class, wherein the type check component generates an error when any of the one or more static subclass components extends the state of the base class; and
   an extension component that exposes static subclass functionality of the one or more static subclass components to other programmatic entities for use or reference.

2. The class extension system of claim 1, wherein the one or more static subclass components include one or more of a static field, a static or instance method and a static or instance property to provide the additional functionality.

3. The class extension system of claim 2, wherein at least one of the one or more static subclass components includes a reference to the base class that it extends.

4. The class extension system of claim 2, wherein at least one of the one or more static subclass components includes an identifier to indicate that the at least one of the one or more static subclass components is static.

5. The class extension system of claim 1, wherein the static subclass generation system includes a receiver component to receive the schema and a generation component to generate the one or more static subclass components.

6. The class extension system of claim 5, wherein the static subclass generation system employs one or more artificial intelligence techniques to infer and construct the one or more static subclass components.

7. The class extension system of claim 1, wherein the schema is an XML schema.

8. The class extension system of claim 1, wherein at least one of the one or more static subclass components and associated base class have different static types but the same dynamic types such that the associated base class can be down cast and the at least one of the one or more static subclass components can be up cast without a runtime performance penalty.

9. A class extension method performed upon one or more computer processors, the class extension method comprising:
   identifying a base class;
   generating a static subclass automatically based on a data source schema that extends a behavior of the base class without extending a state of the base class;
   verifying that the static subclass extends the behavior of the base class and extends the state of the base class;
   verifying that the static subclass extends the behavior of the base class but does not extend the state of the base class by checking fields and methods of the static subclass to determine if they are static to ensure that the static subclass does not extend or attempt to extend the state of the base class;
   generating a data structure representing an error when the static subclass extends the state of the base; and
   exposing static subclass functionality of the static subclass to other programmatic entities for use or reference.

10. The class extension method of claim 9, wherein generating the static subclass comprises specifying zero or more static fields and at least one static or instance method.

11. The class extension method of claim 9, wherein generating the static subclass comprises specifying the base class from which the static subclass inherits.

12. The class extension method of claim 11, wherein generating the static subclass comprises specifying an indicator that designates the static subclass as static.

13. The class extension method of claim 9, further comprising generating the static subclass automatically based on given context.

14. The class extension method of claim 9, wherein the static subclass is generated manually by a programmer employing a text editor.

15. The class extension method of claim 14, wherein the static subclass is generated for a particular problem space only generically addressed by the base class.

16. The class extension method of claim 9, wherein the base class and the static subclass are of the same dynamic type.

17. The class extension method of claim 9, further comprising casting between the base class and static subclass without a runtime cost.

18. A computer-readable storage medium having stored thereon computer executable instructions for performing class extension method comprising:

identifying a base class;

generating a static subclass automatically based on a data source schema that extends a behavior of the base class without extending a state of the base class;

verifying that the static subclass extends the behavior of the base class and extends the state of the base class;

verifying that the static subclass extends the behavior of the base class but does not extend the state of the base class by checking fields and methods of the static subclass to determine if they are static to ensure that the static subclass does not extend or attempt to extend the state of the base class;

generating a data structure representing an error when the static subclass extends the state of the base class; and exposing static subclass functionality of the static subclass to other programmatic entities for use or reference.

* * * * *